United States Patent
Mizuide et al.

(10) Patent No.: US 6,329,471 B1
(45) Date of Patent: Dec. 11, 2001

(54) PROCESS FOR PRODUCING CARBOXYL GROUP-CONTAINING VINYLIDENE FLUORIDE COPOLYMER

(75) Inventors: Fumiyo Mizuide, Iwaki; Haruyoshi Tatsu, Kitaibaraki, both of (JP); Sergey Vasilievich Sokolov; Michail Vasiliyevich Zhuravlev, both of St. Petersburg (RU); Igor Vladimirovich Kokotin; Olga Viktorinovna Blagodatova, both of St. Petersburg (RU)

(73) Assignee: Nippon Mektron Limited (JP)

( * ) Notice: Subject to any disclaimer, the term of this patent is extended or adjusted under 35 U.S.C. 154(b) by 0 days.

(21) Appl. No.: 09/272,825

(22) Filed: Mar. 19, 1999

(30) Foreign Application Priority Data

Mar. 19, 1998 (JP) .................................................. 10-090856

(51) Int. Cl.[7] .......................... C08F 214/22; C08F 8/06; C08F 8/44; C08F 14/22
(52) U.S. Cl. ................................... 525/326.2; 525/326.4; 525/369; 525/387
(58) Field of Search .............................. 525/326.2, 326.4, 525/369, 387

(56) References Cited

U.S. PATENT DOCUMENTS

| | | |
|---|---|---|
| 3,147,314 | 9/1964 | Cluff . |
| 4,645,799 * | 2/1987 | Wachi et al. ...................... 525/326.2 |
| 4,742,126 * | 5/1988 | Moggi et al. ...................... 525/326.2 |

OTHER PUBLICATIONS

Literature "Functional fluorine–containing polymers" pp. 11–12 (1982), published by Nikkan Kogyo Shinbun, Japan.

* cited by examiner

Primary Examiner—Donald R. Wilson
(74) Attorney, Agent, or Firm—Baker & Daniels

(57) ABSTRACT

A carboxyl group-containing fluorine copolymer is produced safely at a low cost by treating a vinylidene fluoride copolymer with a base and a peroxide, preferably in the presence of a phase-transfer catalyst such as a quaternary ammonium salt or a quaternary phosphonium salt.

12 Claims, No Drawings

PROCESS FOR PRODUCING CARBOXYL GROUP-CONTAINING VINYLIDENE FLUORIDE COPOLYMER

BACKGROUND OF THE INVENTION

1. Field of the Invention

The present invention relates to a process for producing a carboxyl group-containing vinylidene fluoride copolymer and more particularly to a process for producing a carboxyl group-containing vinylidene fluoride copolymer for effective used as an oligomer having a functional group at both terminals.

2. Description of Related Art

Functional oligomers having a carboxyl group at both terminals can be effectively used as a chain-elongating agent for epoxy resin, isocyanate resin, etc., or as raw materials for a solvent-resistant sealant, an adhesive, a coating agent, etc., but carboxyl group-containing fluorine-based copolymers cannot be safely produced at a low cost according to the conventional processes as mentioned below.

U.S. Pat. No. 3,147,314 discloses a process, which comprises boiling a vinylidene fluoride-hexafluoropropene copolymer together with an amine in tetrahydrofuran for a long time, thereby effecting dehydrofluorination reaction, followed by oxidative decomposition of the resulting double bond by $KMnO_4$, where not only the dehydrofluorinated copolymer must be once isolated and then subjected to oxidation reaction upon redissolution into acetone, but also the heavy metal Mn used in the oxidative decomposition reaction must be removed. That is, the resulting pollution control is a problem.

Literature "Functional fluorine-containing polymers" pages 11–12 (1982), published by Nikkan Kogyo Shinbun, Japan, discloses a process, which comprises copolymerizing tetrafluoroethylene with $CF_2=CFO(CF_2)_4 COOCH_3$, followed by hydrolysis of side chain ester groups, where the ester group-containing monomer used in the copolymerization reaction is very expensive and thus is not suitable for industrial application, and also the hydrolysis reaction of the ester group does not fully proceed unless under alkaline conditions and thus is hardly applicable to the vinylidene fluoride-based copolymers.

SUMMARY OF THE INVENTION

An object of the present invention is to provide a process for safely producing a carboxyl group-containing fluorine-based copolymer at a low cost.

Such an object of the present invention can be attained by treating a vinylidene fluoride copolymer with a base and a peroxide, preferably in the presence of a phase-transfer catalyst, thereby producing a carboxyl group-containing vinylidene fluoride copolymer.

DETAILED DESCRIPTION OF THE INVENTION

The vinylidene fluoride copolymer for use in the present invention includes, for example, copolymers of vinylidene fluoride [VdF] with at least one of hexafluoropropene [HFP], tetrafluoroethylene [TFE], perfluoro(methyl vinyl ether) [FMVE], perfluoro(ethyl vinyl ether) [FEVE], perfluoro(propyl vinyl ether) [FPVE], chlorotrifluoroethylene [CTFE], ethylene [E], propylene [P], etc., and more specifically VdF-HFP copolymer, VdF-HFP-TEF terpolymer, VdF-TFE copolymer, VdF-CTFE copolymer, VdF-CTFE-TFE terpolymer, VdF-FMVE copolymer, VdF-FEVE copolymer, VdF-FPVE copolymer, VdF-TFE-FMVE terpolymer, VdF-TFE-FMVE-CTFE quaternary copolymer, VdF-P-TFE terpolymer, VdF-HFP-E-TFE quaternary copolymer, etc.

Vinylidene fluoride copolymers containing about 30 to about 85% by mole, preferably about 75 to about 80% by mole, of vinylidene fluoride and having a weight average molecular weight Mw of about $1\times10^5$ to about $9\times10^5$, preferably about $4.5\times10^5$ to $7\times10^5$, a number average molecular weight Mn of about $0.5\times10^5$ to about $6\times10^5$, preferably about $1.5\times10^5$ to about $3.5\times10^5$ and Mooney viscosity $ML_{1+10}$(Method B: MB4-4, 121° C.) of about 5 to about 200, preferably about 20 to about 105, can be used in the present invention. Molecular weights or Mooney viscosities outside the above-mentioned range are not preferable, because of decreases in mechanical characteristics such as tension, elongation, permanent elongation, etc. or poor process ability.

The base for use in the present invention includes, for example, hydroxides and carbonates of alkali metals or alkaline earth metals such as potassium hydroxide, sodium hydroxide, cesium hydroxide, calcium hydroxide, calcium carbonate, etc. and tertiary amines such as triethylamine, etc. The peroxide for use in the present invention includes, for example, hydrogen peroxide, persulfates, organic peroxides (including peracetic acid, organic hydroperoxides, etc.) and the like. Hydrogen peroxide is preferable because of low cost and unnecessary of post-treatment. The base and the peroxide can be added together at the same time or in the order of the base to the peroxide.

When a vinylidene fluoride-hexafluoropropene copolymer typical of the vinylidene fluoride copolymer is treated with KOH and $H_2O_2$, it seems that a vinylidene fluoride-hexafluoropropene copolymer having a carboxyl group at both terminals can be formed according to the following reaction mechanism:

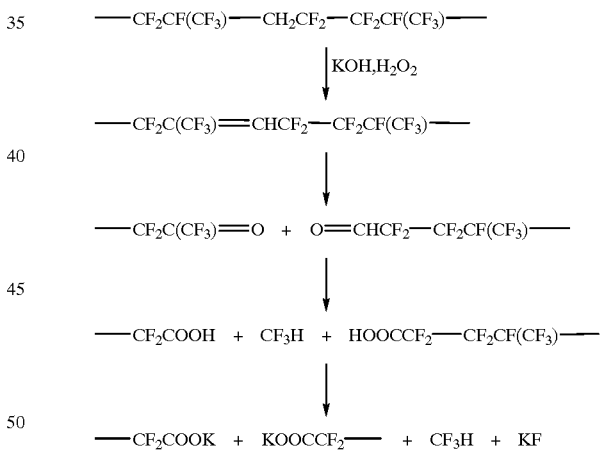

The vinylidene fluoride-hexafluoropropene copolymer is very stable against an oxidizing agent, but is readily dehydrofluorinated in an alkaline medium to form a double bond. Proportion of formed double bond depends uniquely on the amount of the base to be used. For example, when the base is potassium hydroxide, sodium hydroxide or the like, about 0.3 to about 50% by weight, preferably about 3 to about 40% by weight thereof can be used on the basis of the copolymer.

The thus formed double bond is subjected to oxidation reaction with, for example, hydrogen peroxide, as a solution in an organic solvent containing about 5 to about 50% by weight, preferably about 10 to about 30% by weight, of hydrogen peroxide, whereby terminal carboxyl groups can be readily formed. The organic solvent for that purpose includes, for example, any one of vinylidene fluoride copolymer-dissolvable ketones, esters, amides, hydrofluorochlorocarbons, etc. Preferable are acetone, ethyl acetate, etc.

It is desirable from the viewpoint of exothermic control to carry out the treatment with the base and the peroxide at about 0° to about 100° C., preferably about 10° to about 30° C. To improve the reaction rate during the treatment, it is preferable to use a phase-transfer catalyst. As the phase transfer catalyst, about 1 to about 10 parts by weight, preferably about 2 to about 7 parts by weight, of at least one of quaternary ammonium salts and quaternary phosphonium salts represented by the following general formulae can be used on the basis of 100 parts by weight of the copolymer:

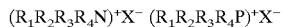

where $R^1$ to $R^4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^-$, etc.

Specifically, the quaternary onium salt includes, for example, quaternary ammonium salts such as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyl-dibenzylammonium bromide, cetyldimethylethylammonium bromide, octadecyltrimethylammonium bromide, cetylpyridinium chloride, cetylpyridinium bromide, cetylpyridinium iodide, cetylpyridinium sulfate, 1-benzylpyridinium chloride, 1-benzyl-3,5-dimethylpyridinium chloride, 1-benzyl-4-phenylpyridinium chloride, 1,4-dibenzylpyridinium chloride, 1-benzyl-4-(pyrrolidinyl)pyridinium chloride, 1-benzyl-4-pyridino-pyridinium chloride, tetraethylammonium acetate, trimethyl-benzylammonium benzoate, trimethylbenzylammonium-p-toluene sulfonate, trimethylbenzylammonium borate, 8-benzyl-1,8-diaza-bicyclo[5,4,0]-undec-7-enium chloride, 1,8-diazabicyclo[5,4,0]-undecen-7-methylammonium methosulfate, 5-benzyl-1,5-diaza-bicyclo[4,3,0]-5-nonenium chloride, 5-benzyl-1,5-diazabicyclo-[4,3,0]-5-nonenium bromide, 5-benzyl-1,5-diazabicyclo[4,3,0]-5-nonenium tetrafluoroborate, 5-benzyl-1,5-diazabicyclo[4,3,0]-5-nonenium hexafluorophosphate, etc., and quaternary phosphonium salts such as tetraphenylphosphonium chloride, triphenylbenzylphosphonium chloride, triphenylbenzylphosphonium bromide, tri-phenylmethoxymethylphosphonium chloride, triphenylmethyl-carbonylmethylphosphonium chloride, triphenylethoxycarbonyl-methylphosphonium chloride, trioctylbenzylphosphonium chloride, trioctylmethylphosphonium bromide, trioctylethylphosphonium acetate, trioctylethylphosphonium dimethyl phosphate, tetra-octylphosphonium chloride, cetyldimethylbenzylphosphonium chloride, etc.

The treatment is carried out for about 3 to about 24 hours, and then a sulfite or the like is added thereto, if required, to decompose the excess peroxide. Then, hydrochloric acid is added to the organic phase of the reaction mixture to adjust the pH to 2~3, followed by filtration. Water is added to the filtrate to precipitate the product.

Infrared absorption spectrum, etc. of the resulting product revealed the presence of about 1 to about 4.5% of carboxyl groups and showed that the product was vinylidene fluoride copolymers having a number average molecular weight Mn of about $2\times10^3$ to about $10\times10^3$, preferably about $2\times10^3$ to about $5\times10^3$ and a dynamic viscosity $\eta_{50°C.}$ of about 100 to about 5,000, preferably about 100 to about 2,000.

According to the present process, a carboxyl group-containing fluorine-based copolymer can be produced safely at a low cost in a good yield of about 90 to about 99% without necessity for special pollution control, etc. The resulting carboxyl group-containing fluorine-based copolymer is a fluorine-containing oligomer having a carboxyl group at both terminals and thus can be effectively used as a chain-elongating agent for epoxy resin, isocyanate resin, etc., or as raw materials for a solvent-resistant sealant, an adhesive, a coating agent, etc.

PREFERRED EMBODIMENTS OF THE INVENTION

The present invention will be described in detail below, referring to Examples and Reference Example.

EXAMPLE 1

An aqueous solution containing 0.2 g of sodium hydroxide dissolved in 4 ml of water was dropwise added to a solution containing 4 g of vinylidene fluoride-hexafluoropropene (molar ratio=80:20) copolymer (Mw=$6.1\times10^5$; Mn=$3.4\times10^5$, $ML_{1+10}$(121° C.)=55 and $\eta sp/c$=1.05) dissolved in 40 g of acetone to conduct reaction for one hour with stirring. Then, the same amount of the aqueous sodium hydroxide solution having the same concentration as above and an aqueous solution containing 1.7 g of 30% hydrogen peroxide dissolved in 4 ml of water were dropwise added thereto substantially at the same time to conduct reaction for further one hour. Then, an aqueous solution containing 19 g of sodium sulfite dissolved in 100 ml of water was added thereto with stirring and the reaction mixture was left for standing overnight.

The aqueous layer of the reaction mixture was removed by decantation, and the polymer residues were washed four times each with 120 ml of water, followed by centrifuging and drying. The product was identified from its infrared absorption spectrum and $\eta sp/c$ value of 0.16 to be a fluorine-containing oligomer having a COONa group at both terminals (yield: 69.5%).

Infrared absorption spectrum: 1660 $cm^{-1}$ (C=O)

EXAMPLE 2

Into a glass reactor vessel having a capacity of 5.5 L, provided with a stirrer, a dropping funnel, a thermometer and a gas vent tube was charged 450 g of vinylidene fluoride-hexafluoropropene (molar ratio=75:25) copolymer (Mw=$8.2\times10^5$, Mn=$5.3\times10^5$, $ML_{1+10}$(121° C.)=78, $\eta sp/c$=1.11) in the form of a 13 wt. % acetone solution, followed by cooling to 19° C. on a water bath. Then, 28.4 g of benzyltriphenylphosphonium chloride (BTPPC) and 177.3 g of 32% $H_2O_2$ were successively added thereto, followed by stirring for 15 minutes. Then, 72.5 g of KOH in the form of an aqueous 45 wt. % solution was added thereto, followed by stirring for 25 minutes.

Stirring was continued at 23°~25° C. for 7 hours, and then the reaction mixture was left for standing overnight. The aqueous phase as the lower layer (pH11) was removed from the reaction mixture and the organic phase residues as the upper layer (pH7) were admixed with strong hydrochloric acid to make the pH acidic (pH2), thereby precipitating oligomers in a relatively high molecular weight range. The oligomer precipitates were recovered by filtration, and the filtrate was admixed with water to precipitate oligomers in a low molecular weight range. To completely remove the peroxide and $F^-$ from the precipitates, operation to reprecipitate the oligomers from a 50% acetone solution by water was repeated twice to four times.

The wet copolymers were dried on a glass dish at 60°~65° C. (5 mmHg), where the end point of drying was confirmed by infrared absorption spectrum, observing no more absorption of $H_2O$ at 3300 cm$^{-1}$ and of acetone at 1700 cm$^{-1}$. By drying for 95 hours, 427.0 g of carboxyl group-containing vinylidene fluoride-hexafluoropropene copolymer having the following characteristics was obtained (yield: 95%).

Dynamic viscosity $\eta_{50°}$=780 Pa·s

Number average molecular weight Mn=4300±400

COOH content=1.9±0.5%

Infrared absorption spectrum: 1760 cm$^{-1}$ (C=0)

$^{19}$F-NMR(CFCl$_3$ basis): −115~120 ppm(—CF$_2$COOH)

$^1$H-NMR(SiMe$_4$ basis): 9~10 ppm(—COOH)

EXAMPLE 3 TO 10

In Example 2, the amount of the aqueous 45% KOH solution was changed to 14.5 g only in Example 6 and 72.5 g for all other Examples, and the amount of 32% $H_2O_2$ and the species and amount of the catalyst were changed as given in the following Table 1, where BTEAC: benzyltriethylammonium chloride. The results are also given in the following Table 1, where IRS is a ratio of $I_{1760}/I_{1450}$, $\eta_{50°}$ is Brookfield type viscosity at 50° C., and COOH content is given by a titration value of 0.04N KOH ethanol solution for a oligomer solution in solvent mixture of $C_2H_5OC_2H_4OH$—$CF_2ClCFCl_2$ (volumic ratio=1:2), using a 0.1% alcoholic phenolphthalein indicator.

TABLE 1

| Ex. No. | $H_2O_2$ (g) | Cat. (g) | Yield (%) | IRS | $\eta_{50°}$ (Pa·s) | Mn | COOH (%) | Neutralization equiv. wt. |
|---|---|---|---|---|---|---|---|---|
| 3 | 177.3 | BTPPC 28.4 | 99 | 1.11 | 1090 | 4300 ± 400 | 2.1 ± 0.15 | 2140 ± 150 |
| 4 | " | — | 99 | 1.04 | 980 | 3900 ± 350 | 2.0 ± 0.15 | 2250 ± 170 |
| 5 | " | — | 97 | 1.04 | 1040 | 3800 ± 400 | 2.2 ± 0.15 | 2050 ± 140 |
| 6 | 354.6 | — | 92 | 1.58 | 142 | 2400 ± 200 | 3.6 ± 0.15 | 1250 ± 50 |
| 7 | 177.3 | BTPPC 28.4 | 98 | 1.13 | 980 | 3800 ± 300 | 1.9 ± 0.15 | 2370 ± 190 |
| 8 | " | BTEAC 16.7 | 94 | 1.22 | 390 | 3600 ± 300 | 2.2 ± 0.15 | 2050 ± 140 |
| 9 | 354.6 | " | 95 | 1.20 | 450 | 3800 ± 300 | 2.1 ± 0.15 | 2250 ± 170 |
| 10 | " | BTPPC 14.2 | 97 | 1.14 | 1000 | 4000 ± 350 | 1.8 ± 0.15 | 2500 ± 200 |

EXAMPLES 11 TO 18

In Example 2, the amount of vinylidene fluoride-hexafluoropropene copolymer was changed to 10 g, and the amounts of aqueous 45% KOH solution, 32% $H_2O_2$ and BTPPC catalyst and reaction time were changed as given in the following Table 2. The results are also given in the following Table 2.

TABLE 2

| Example No. | 45% KOH (g) | 32% $H_2O_2$ (g) | BTPPC (g) | Reaction time (hrs) | Yield (%) | IRS |
|---|---|---|---|---|---|---|
| 11 | 1.61 | 7.79 | 0.63 | 24 | 98 | 1.10 |
| 12 | " | 7.69 | — | 7 | 95 | 1.10 |
| 13 | " | " | — | 3 | 93 | 1.11 |
| 14 | " | 3.94 | — | 5 | 94 | 1.09 |
| 15 | 3.22 | 8.01 | — | " | 90 | 1.46 |
| 16 | 1.61 | 1.96 | — | " | 95 | 1.15 |
| 17 | 3.22 | 3.94 | — | " | 90 | 1.45 |
| 18 | 0.80 | " | — | " | 99 | 0.70 |

REFERENCE EXAMPLE 100 parts by weight of carboxyl group-containing vinylidene fluoride- hexafluoropropene copolymer obtained in one of Examples 2 and 7 to 10 was mixed with 9 parts by weight of epoxy resin (Epikote 154, a product of NOF Corp., Japan), and the mixture was sandwiched between two sheets of polytetrafluoroethylene film, and subjected to heat compression treatment at 130° C. for one hour and then to heat treatment at 130° C. under the atmospheric pressure for one hour. The resulting laminate film was tested to determine strength and elongation at break and residual elongation, according to JIS K-6301. The results are given in the following Table 3.

TABLE 3

| No. | Copolymer | Strength at break (MPa) | Elongation at break (%) | Residual elongation (%) |
|---|---|---|---|---|
| 1 | Example 2 | 14.3 | 240 | 5 |
| 2 | Example 7 | 13.9 | 240 | 5 |
| 3 | Example 8 | 7.0 | 220 | 5 |
| 4 | Example 9 | 7.5 | 230 | 5 |
| 5 | Example 10 | 12.9 | 230 | 5 |

What is claimed is:

1. A process for producing a carboxyl group-containing vinylidene fluoride copolymer, which comprises treating a vinylidene fluoride copolymer with a base and a peroxide.

2. A process according to claim 1, wherein the vinylidene fluoride copolymer that is to be treated with the base and the peroxide is a copolymer containing about 30 to about 85% by mole of vinylidene fluoride.

3. A process according to claim 1, wherein the vinylidene fluoride copolymer that is to be treated with the base and the peroxide is a copolymer having a weight average molecular weight Mw of $1 \times 10^5$ to $9 \times 10^5$, a number average molecular weight Mn of $0.5 \times 10^5$ to $6 \times 10^5$ and a Mooney viscosity ML$_{1+10}$(121° C.) of about 5 to about 200.

4. A process according to claim 1, wherein the base is a hydroxide or a carbonate of alkali metal or alkaline earth metal.

5. A process according to claim 1, wherein the peroxide is hydrogen peroxide, a persulfate or an organic peroxide.

6. A process according to claim 1, where the base and the peroxide are added to the reaction system at the same time.

7. A process according to claim 1, wherein the base and the peroxide are added to the reaction system in the order of the base then the peroxide.

8. A process according to claim 5, wherein the hydrogen peroxide as a peroxide is used as an organic solvent solution.

9. A process according to claim 1, wherein the treatment is carried out in the presence of a phase-transfer catalyst.

10. A process according to claim 9, wherein the phase-transfer catalyst is a quaternary ammonium salt.

11. A process according to claim 9, wherein the phase-transfer catalyst is a quaternary phosphonium salt.

12. A process according to claim 1, wherein the carboxyl group-containing vinylidene fluoride copolymer has about 1 to about 4.5% of carboxyl group.

* * * * *